United States Patent [19]

Weizenburger et al.

[11] Patent Number: 5,234,051
[45] Date of Patent: Aug. 10, 1993

[54] COMPACT HEAT EXCHANGER-VENTILATION UNIT FOR A VEHICLE

[75] Inventors: Hans Weizenburger, Cologne; Michael Klocke, Solingen; Dieter Roschinski, Cologne, all of Fed. Rep. of Germany

[73] Assignee: Klöckner-Humboldt-Deutz Aktiengesellschaft, Cologne, Fed. Rep. of Germany

[21] Appl. No.: 888,031

[22] Filed: May 22, 1992

[30] Foreign Application Priority Data

May 28, 1991 [DE] Fed. Rep. of Germany ....... 4117392
Jul. 8, 1991 [DE] Fed. Rep. of Germany ....... 4122512

[51] Int. Cl.⁵ .................. F28D 1/00; B60K 11/04; F01P 3/18; F02B 29/04
[52] U.S. Cl. ........................ 165/41; 165/51; 165/67; 165/140; 165/77; 180/68.1; 180/68.4; 123/41.31; 123/41.49; 123/563
[58] Field of Search ............. 165/41, 44, 51, 122, 165/140, 67, 77; 123/41.49, 41.31, 563; 60/599; 180/68.1, 68.4

[56] References Cited

U.S. PATENT DOCUMENTS

| | | | |
|---|---|---|---|
| 2,505,790 | 5/1950 | Panthofer | 165/140 |
| 2,899,026 | 8/1959 | Hitch et al. | 165/41 |
| 3,692,004 | 9/1972 | Tangue et al. | 165/122 |
| 3,854,459 | 12/1974 | Stimeling | 123/41.49 |
| 4,018,297 | 4/1977 | Haupt | 123/41.49 |
| 4,059,080 | 11/1977 | Rudert | 60/599 |
| 4,531,574 | 7/1985 | Hoch | 165/41 |
| 4,651,816 | 3/1987 | Struss et al. | 165/140 |
| 4,696,361 | 9/1987 | Clark et al. | 165/41 |
| 4,923,001 | 5/1990 | Marcolin | 165/140 |
| 4,995,447 | 2/1991 | Weidmann et al. | 165/44 |
| 4,997,033 | 3/1991 | Ghiani et al. | 123/563 |
| 5,012,768 | 5/1991 | Roschinski | 123/41.49 |
| 5,046,554 | 9/1991 | Iwasaki et al. | 165/44 |
| 5,095,882 | 3/1992 | Christensen | 60/599 |

OTHER PUBLICATIONS

Agee, Keith "The Influence of Vehicle Installation in the Design of Chassis Mounted Coolers" SAE Technical Paper Series #851473 1985 pp. 1-7.

*Primary Examiner*—John K. Ford
*Attorney, Agent, or Firm*—Charles L. Schwab

[57] ABSTRACT

This invention relates to a compact heat exchanger-ventilation unit, for vehicles driven by internal-combustion engines which is compact and permits use of a narrow, low hood. The cooling air fan 1 has a diffuser and the resistance of the heat exchangers on the cooling air side is adapted to the delivery level of the cooling air fan 1. A refrigeration system condenser 7, charge air cooler 6, transmission oil cooler 4, motor coolant heat exchanger 3 and hydraulic oil cooler 5 are thus compactly arranged.

8 Claims, 3 Drawing Sheets

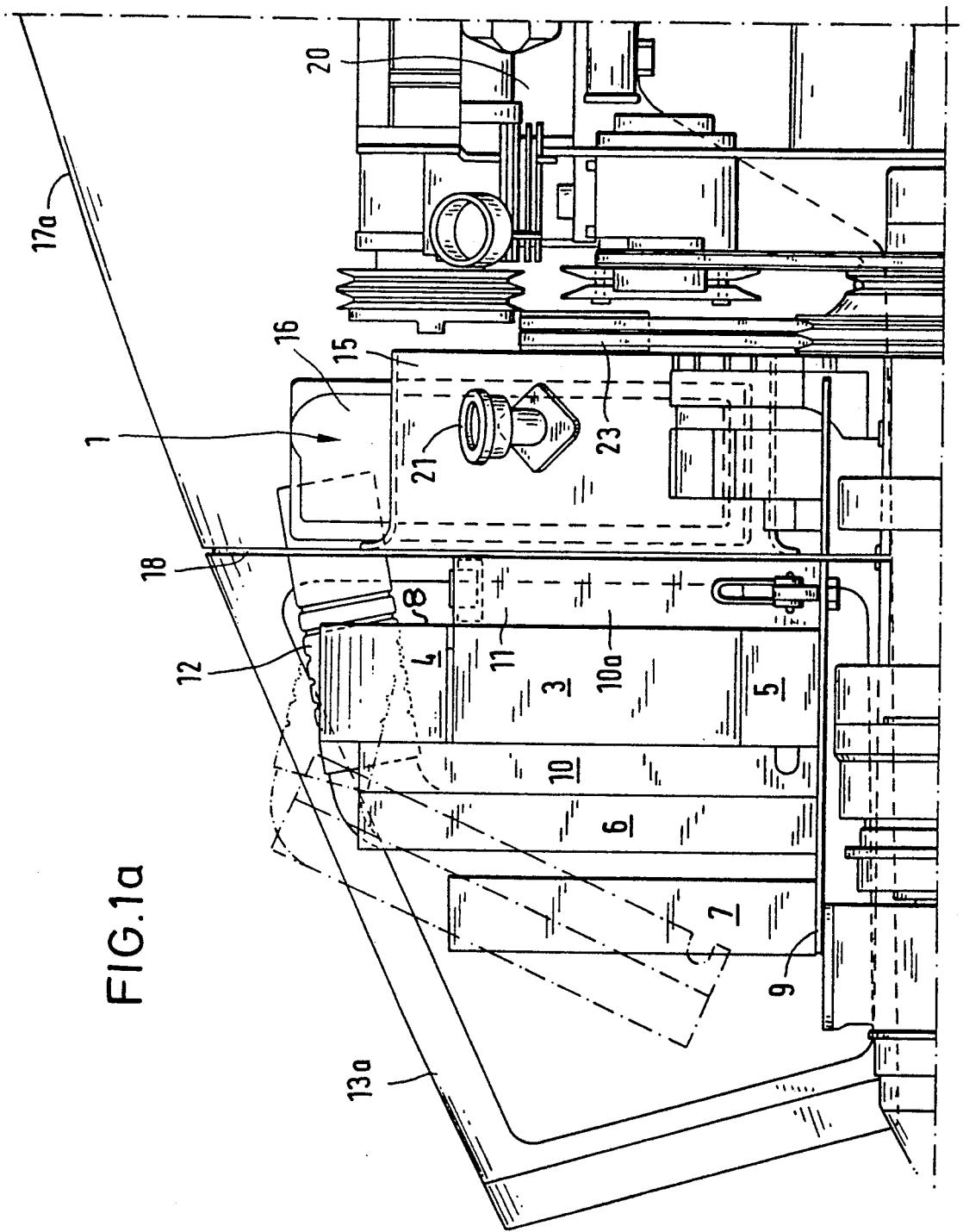

COMPACT HEAT EXCHANGER-VENTILATION UNIT FOR A VEHICLE

TECHNICAL FIELD

This invention relates to a compact heat exchanger-ventilation unit, preferably for vehicles driven by internal-combustion engines, having a cooling air fan and at least one heat exchanger.

PRIOR ART STATEMENT

In vehicles, in particular working machinery such as, for example, construction machines or agricultural tractors, value is increasingly placed on unobstructed vision onto the travel path or the working accessories and the land to be treated. For this purpose, drive units of the smallest possible volume, having a compact cooling system, are required, which drive units must fit under a narrow, flat, or downward-sloping hood.

OBJECTS AND SUMMARY OF THE INVENTION

It is accordingly an object of the invention to create a cooling system as compact as possible, which permits a narrow and low hood.

By means of the use of a diffuser, the fan in accordance with the invention attains a delivery level that permits a great depth of the heat exchanger grid and thus a relatively small effective are of the heat exchanger grid. In this fashion, a small installation space for heat exchanger an cooling air fan is brought about.

An advantageous development of the invention permits a flexible adaptation of the heat exchanger-ventilation unit to the installation and space conditions in each instance by means of arranging the heat exchangers on the suction or pressure side or both sides of the fan.

By means of an advantageous development of the invention, the structural height of the individual heat exchangers for transmission oil, hydraulic oil, fuel and motor coolant is brought to the size of the heat exchanger-ventilation unit. By means of the abutment without play of the working surfaces of these assembled heat exchangers, space is saved and a high heat exchanger efficiency is attained.

An advantageous development of the invention permits a space-saving supply and removal of the motor coolant to the motor coolant heat exchanger. The smaller width of the hydraulic oil heat exchanger, in comparison with the motor coolant heat exchanger, is utilized in order to integrate additional water boxes into the oil boxes of said hydraulic oil heat exchanger without exceeding the overall width of the coolant heat exchanger, and at the same time in order to reduce the structural height of said coolant heat exchanger by the height of the water box.

The arrangement of the several heat exchangers in accordance with the invention is adapted to the temperature level of each heat exchanger. The refrigerant heat exchanger, with its lowest temperature level, is the first one flowed through, while the motor coolant heat exchanger and the hydraulic oil heat exchanger, as well as the fuel heat exchanger, with their elevated temperature level, are the last ones flowed through.

The attachment of heat exchangers and cooling air fan to a common base plate offers the advantage of simple pre-assembly of the entire heat exchanger-ventilation unit. The assembly of the entire working machine is facilitated by this means. The various distances between the individual heat exchangers and the cooling air fan serve to load said heat exchangers equally with cooling air and to provide accessibility of the working surfaces for cleaning purposes.

An advantageous development of the invention effects good utilization of the cooling air, since said cooling air is maximally heated by means of multiple utilization. Because the refrigerant heat exchanger has a lower cooling air requirement, compulsory guidance of the cooling air and the expense associated therewith can be dispensed with here. Furthermore, in this fashion and in conjunction with the hose connection for the refrigerant, particularly simple disassembly and cleaning of the refrigerant heat exchanger is enabled.

An advantageous development of the invention permits simple cleaning of the working surface of the charge air heat exchanger. Here the loosening of two screws is sufficient to pivot the charge air heat exchanger up and forward out of the way and make it accessible for cleaning. The elastic hose connection with the charge air heat exchanger not only has the advantage of simple disassembly of said heat exchanger, but also permits the maintenance of a pressure-tight charge air system.

An advantageous development of the invention permits the space-saving placement of the compensator tank for motor coolant next to a fill pipe for said coolant.

An advantageous development of the invention offers great flexibility with respect to the drive of the cooling air fan. By this means, the arrangement of the cooling air fan or of the heat exchanger-ventilation unit can be selected in largely free fashion.

By means of an advantageous development of the invention, a relatively narrowly structured hood is achieved, since the small width of the liquid-cooled motor is not enlarged by means of the arrangement of the heat exchangers, and the space under the hood and in front of the motor is optimally utilized.

By means of an advantageous development of the invention, the space under the hood is divided into a cooling air inflow region and a cooling air outflow region, between which no short-circuit flow occurs. This strict division is important for the effectiveness of the cooling system.

A further advantageous development of the invention combines a stable, airtight attachment of the rigid part of the hood to the bulkhead on the one hand with good accessibility of the heat exchangers on the other hand. By this means, the frequent cleaning of the heat exchanger grids, which is necessary in the case of working machinery, is enabled without increased cost.

An advantageous development of the invention permits large-area openings in the partial hood, through which openings the cooling air can be drawn in at a relatively low velocity. By this means, throttling losses and the danger of plugging of the lateral openings are held within limits.

BRIEF DESCRIPTION OF THE DRAWINGS

Further features of the invention are implied by the description that follows and the Drawing, in which an exemplary embodiment is illustrated schematically.

FIG. 1a shows a lateral view of the heat exchanger-ventilation unit installed in the front part of an agricultural tractor.

DETAILED DESCRIPTION OF THE INVENTION

Figure 1:
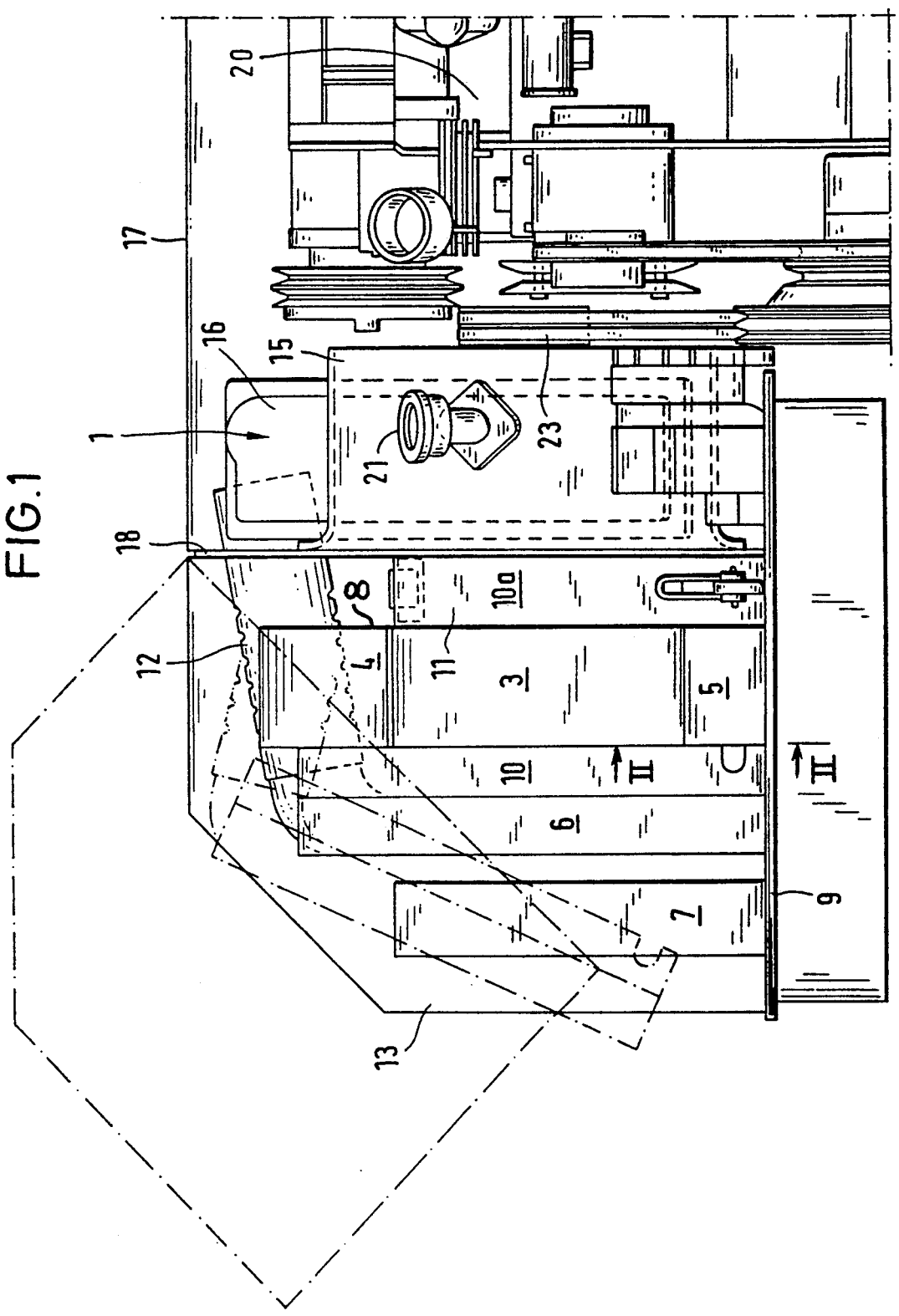
FIG. 1 shows a lateral view of the heat exchanger-ventilation unit installed in the front part of a vehicle.

FIGS. 1 and 1a show the form and arrangement of the hood 17 and 17a, respectively, with the partial hood 13 and 13a, respectively, and the units located thereunder.

The hood 17 and 17a, respectively, is rigidly bolted to the bulkhead 18, which in turn is rigidly bolted to a horizontally extending support in form of a horizontal base plate 9. The base plate 9 is rigidly connected to the axle bracket of the front axle of the tractor. The heat exchanger block 8, the charge air heat exchanger 6 and the refrigerant heat exchanger 7 are rigidly bolted to the base plate 9. The heat exchangers (6, 7) and heat exchanger block (8) are upright components spaced horizontally from one another in series in the direction of cooling air flow. The refrigerant heat exchanger 7 is connected to the refrigerant circuit via hoses, so that, after loosening of the mounting bolts, it can be cleaned in problem-free fashion without disassembly of the connections. As viewed in the direction of cooling air flow, it is placed in the first position, because the temperature level of the refrigerant is the lowest and for this reason unheated cooling air is required for its cooling. Its low structural height permits the downward-sloping shape of the partial hood 13 and 13a, respectively. The spacing from it to the charge air heat exchanger 6, lying behind it, is small. Nonetheless, the load on the charge air heat exchanger is uniform, because no cooling air guide is present between refrigerant heat exchanger 7 and charge air heat exchanger 6. In this fashion, the cooling air can also flow from the side and from above into the gap between charge air heat exchanger 6 and refrigerant heat exchanger 7. The charge air heat exchanger 6 is brought to the desired low temperature level by means of the cooling air of the refrigerant heat exchanger 7, which cooling air is heated only slightly.

The charge air heat exchanger 6 possesses a greater structural height than the refrigerant heat exchanger 7, by which means the shape of the partial hood 13 must rise. The charge air heat exchanger 6 is pivotable forward and upward for maintenance purposes, as indicated by broken lines. The charge air connections need not be removed for pivoting, since these connections are elastic hose elements 12. The gap between the charge air heat exchanger 6 and the heat exchanger block 8 is hermetically sealed on both sides and on top by means of a cooling air guide 10. In this fashion, the entire cooling air of the charge air heat exchanger 6 is conveyed to the subsequent heat exchanger block 8. The spacing between charge air heat exchanger 6 and heat exchanger block 8 is selected such that the heat exchanger block 8 is uniformly loaded with cooling air.

Figure 2:
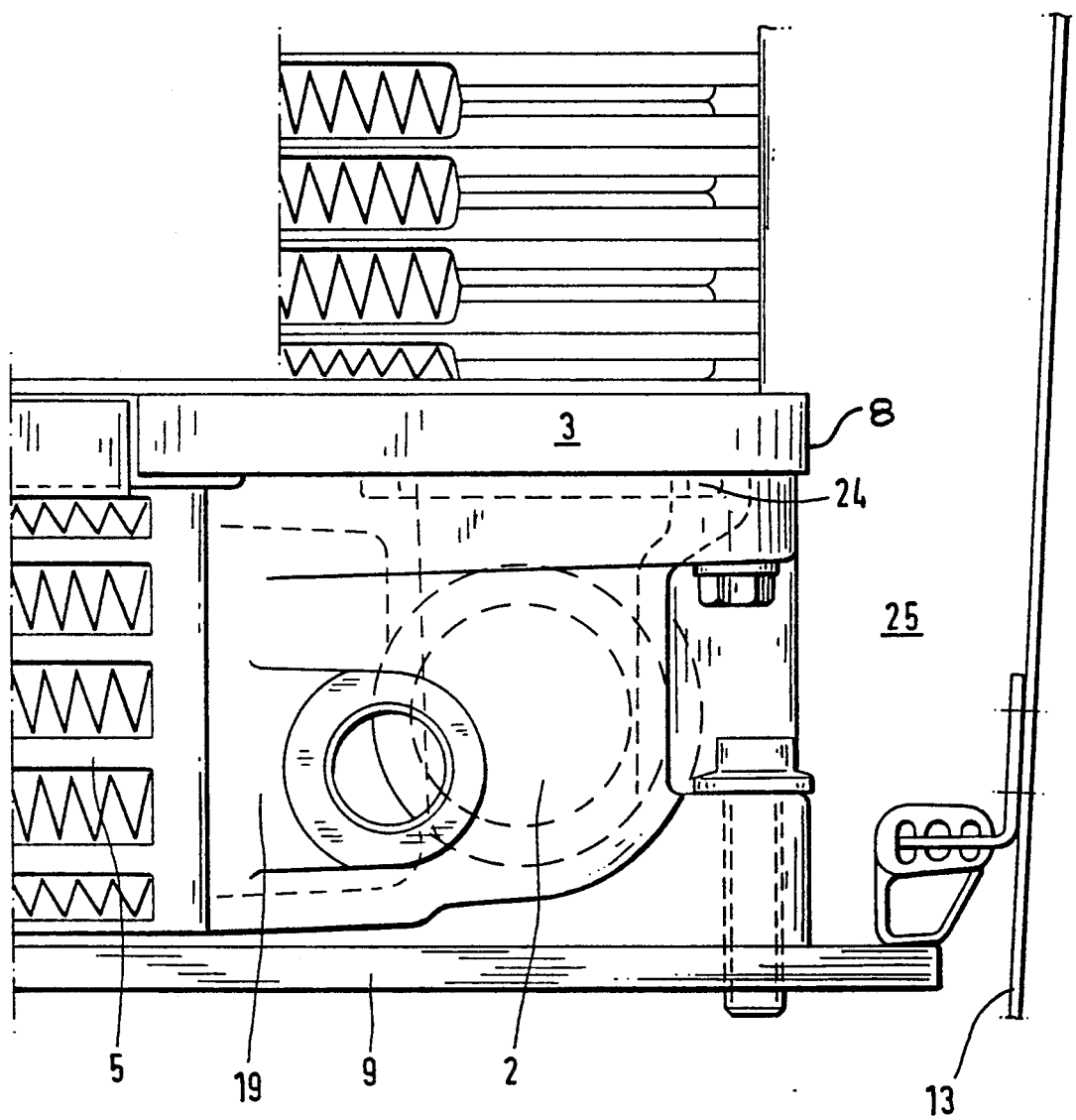
FIG. 2 shows a detail view of a combined oil/water box of the hydraulic oil cooler.

The heat exchanger block 8 comprises the upper transmission oil heat exchanger 4, the motor coolant heat exchanger 3 lying thereunder, and the hydraulic oil heat exchanger 5 lying thereunder. All three heat exchangers are bolted together and have the same depth. The overall height of the heat exchanger block 8 in turn determines the shape of the partial hood 13 and 13a, respectively. The width of the transmission oil heat exchanger 4 and of the hydraulic oil heat exchanger 5 is less than that of the motor coolant heat exchanger 3. The space resulting therefrom is utilized by the transmission oil heat exchanger 4 for the passage of the elastic hose elements 12 of the charge air heat exchanger 6. A water or liquid coolant box 2 is integrated into each of the oil boxes 19 of the hydraulic oil heat exchanger 5 to form a fluid flow manifold by means of the separate fluid passages in the boxes 2, 19, oil flows to the heat exchanger 3 and, the motor coolant flows into the motor coolant heat exchanger 3, lying thereover, which heat exchanger 3 is rigidly bolted to the oil box 19 of the hydraulic oil cooler 5. The water coolant box 2 is maintained in fluid tight relation to the motor coolant heat exchanger 3 via seals 24. In this fashion, as can be seen from FIG. 2, the structural height of the motor coolant heat exchanger 3 is reduced by the height of the water box 2. As is also shown in FIG. 2, a space 25 is provided between the partial hood section 13 and the heat exchanger block 8. This space 25 is closed airtight against the compartment of the engine 20 by the bulkhead 18. The space 25 is in communication with the atmosphere because of lateral openings in the partial hood 13.

Because of the two connections for each of the three heat exchangers, the heat exchanger block 8 is not disassembled for the cleaning of its working surfaces. For this reason, the spacing between the heat exchanger block 8 and the bulkhead 18 is selected so large that a steam-jet cleaning device can be inserted between the two. This spacing gap is hermetically sealed on both sides and from above by means of a cooling air guide 10a. A part of the cooling air guide 10a is designed as an openable service door 11.

The shroud 15 of the cooling air fan 1 is bolted to the other side of the bulkhead 18, which fan is likewise rigidly attached to the base plate 9. The bulkhead 18 is sealed against the hood 17 and 17a, respectively, and the fan intake of the fan shroud 15, which has the usual opening in alignment with an air intake opening of corresponding size in the bulkhead. In this fashion, the cooling air intake region and the cooling air outflow region are strictly separated, so that a short circuit of cooling air is prevented.

The cooling air fan, 1 is driven by the internal-combustion engine 20 via V-belts 23. On its shroud 15 it has an integrated water compensation tank 16, which is provided with a water fill pipe 24. The cooling air fan 1 draws the cooling air in via lateral and forward openings in the partial hood 13 and 13a, respectively, delivers the cooling air through the refrigerant heat exchanger 7, the charge air heat exchanger 6 and the heat exchanger block 8, and blows the heated cooling air into the motor compartment under the hood 17 and 17a, respectively. From there, the heated cooling air flows laterally along the internal-combustion engine 20 toward the rear and down. The arrangement described represents a compact cooling system, which makes possible a narrow, flat or downward-sloping hood.

The embodiments of the invention in which an exclusive property or privilege is claimed are defined as follows:

1. A compact heat exchanger-ventilation unit in combination with an internal combustion engine (20) of the type used to drive a vehicle, comprising:

a horizontal base plate (9) at one end of said engine (20);

a cooling air fan (1) mounted on said base plate (9) for delivering cooling air toward said engine (20);

a heat exchanger block (8) mounted on said base plate (9) in front of said fan (1) and including
  a motor coolant heat exchanger (3);
  a hydraulic oil heat exchanger (5);
  a transmission oil heat exchanger (4);
  said heat exchangers being stacked in one next to another relationship to form a heat exchanger block (8) and having working surfaces approximately abutting in one next to another relationship, said working surfaces having approximately equal flow resistance to cooling air delivered by said cooling air fan (1);
a charge air heat exchanger (6) mounted on said base plate (9) in front of said heat exchanger block (8);
a refrigerant heat exchanger (7) mounted on said base plate (9) in front of said charge air heat exchanger;
said charge air heat exchanger (6) being shorter in height than said heat exchanger block (8);
said refrigerant heat exchanger (7) being shorter in height than said charge air heat exchanger (6);
said refrigerant air heat exchanger (7), said charge air heat exchanger (6), said heat exchanger block (8) and said cooling air fan (1) being spaced apart in series relationship one behind another in the direction of cooling air flow;
a cooling air guide (10) between said charge air heat exchanger (6) and said heat exchanger block (8);
a cooling air guide (10a) between said heat exchanger block (8) and said cooling air fan (1) and
a hood (17, 17a) enveloping said engine (20) and said cooling air fan (1) to at least partially form an engine compartment and including a partial hood (13, 13a) enveloping said heat exchangers (6, 7) and said heat exchanger block (8) and including a portion sloping downwardly in a forward direction.

2. The heat exchanger-ventilation unit of claim 1 wherein one of said oil heat exchangers (4, 5) is positioned above said motor coolant heat exchanger (3) and the other of said oil heat exchangers is positioned below said motor coolant heat exchanger (3), said oil heat exchangers being of less width than the width of said motor coolant heat exchanger (3) and wherein the other of said oil heat exchangers has a fluid flow manifold at one of its lateral sides in supporting and sealed relation to said motor coolant heat exchanger (3), said fluid manifold lying within the lateral width of said motor coolant heat exchanger (3) and having passages independently conveying oil to said other oil heat exchanger and coolant to said motor heat exchanger.

3. The heat exchanger-ventilation unit of claim 1 wherein adjacent heat exchangers of said heat exchanger block (8) have liquid coolant boxes (2, 19) and the inflow and outflow of motor coolant to and from said motor coolant heat exchanger (3) take place via said liquid coolant boxes (2), which are integrated into said liquid coolant boxes (19) of adjacent heat exchangers and are sealingly connected to said motor coolant heat exchanger (3).

4. The heat exchanger-ventilation unit of claim 1 wherein said cooling air guide (10a) has at least one service door (11) in the region between said heat exchanger block (8) and said cooling air fan (1).

5. The heat exchanger-ventilation unit of claim 1 wherein a space (25) is provided between said partial hood (13, 13a) and said cooling air guide (10, 10a), which space is closed from direct access to said compartment of said internal-combustion engine (20) by means of a bulkhead (18).

6. The heat exchanger-ventilation unit of claim 5 wherein said partial hood (13, 13a) has lateral openings, by means of which said space (25) between said partial hood (13, 13a) and said cooling air guide (10, 10a) is in communication with the atmosphere.

7. A compact heat exchanger-ventilation unit for a vehicle driven by an internal combustion engine (20) comprising:
  a horizontally extending support at one end of said engine (20);
  a cooling air fan (1) mounted on said support for delivering cooling air toward said engine (20) and
  an upright heat exchanger block (8) mounted on said support in front of said fan (1) and including a motor coolant heat exchanger (3), a first oil heat exchanger above said motor coolant heat exchanger and a second oil heat exchanger below said motor coolant heat exchanger, the width of said second oil heat exchanger being less than the width of said motor coolant heat exchanger, said second oil heat exchanger including a fluid flow manifold having at least one of its sides in supporting and sealed relation to said motor coolant heat exchanger (3), said fluid manifold lying substantially within the lateral width of said motor coolant heat exchanger (3) and including separate passages conveying oil to said second oil heat exchanger and motor coolant to said motor coolant heat exchanger (3).

8. The heat exchanger-ventilation unit of claim 7 and further comprising an upright charge air heat exchanger (6) mounted on said support in front of and in series with said heat exchanger block (8) including elastic hose elements (12) wherein said first oil heat exchanger is of less width than said motor coolant heat exchanger thereby providing open spaces above laterally opposite portions of said motor coolant heat exchanger and at laterally opposite sides of said first oil heat exchanger and wherein said hose elements extend through said spaces toward said engine.

* * * * *